US011546780B2

(12) United States Patent
Bellamkonda et al.

(10) Patent No.: US 11,546,780 B2
(45) Date of Patent: *Jan. 3, 2023

(54) METHOD AND SYSTEM FOR POLYMORPHIC ALGORITHM-BASED NETWORK SLICE ORCHESTRATION

(71) Applicant: Verizon Patent and Licensing Inc., Basking Ridge, NJ (US)

(72) Inventors: Krishna K. Bellamkonda, Roanoke, TX (US); Kristen Sydney Young, Morris Plains, NJ (US); Ravi Potluri, Coppell, TX (US); Jin Yang, Orinda, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/234,912

(22) Filed: Apr. 20, 2021

(65) Prior Publication Data

US 2021/0297876 A1 Sep. 23, 2021

Related U.S. Application Data

(63) Continuation of application No. 16/823,952, filed on Mar. 19, 2020, now Pat. No. 11,012,872.

(51) Int. Cl.
*H04L 41/0823* (2022.01)
*H04W 24/02* (2009.01)
*G06N 20/00* (2019.01)

(52) U.S. Cl.
CPC .......... *H04W 24/02* (2013.01); *G06N 20/00* (2019.01); *H04L 41/0823* (2013.01)

(58) Field of Classification Search
None
See application file for complete search history.

(56) References Cited

U.S. PATENT DOCUMENTS

| | | | |
|---|---|---|---|
| 2009/0125880 A1* | 5/2009 | Manolescu | G06F 8/24 717/110 |
| 2010/0248643 A1* | 9/2010 | Aaron | H04L 1/0022 709/233 |
| 2012/0227091 A1* | 9/2012 | Smith | H04L 45/24 726/4 |
| 2016/0380892 A1* | 12/2016 | Mahadevan | H04L 45/70 370/389 |
| 2018/0359192 A1* | 12/2018 | Salle | H04L 47/70 |
| 2019/0245750 A1 | 8/2019 | Banda et al. | |
| 2020/0008169 A1 | 1/2020 | Henry et al. | |
| 2020/0260427 A1 | 8/2020 | Schefczik et al. | |
| 2020/0323038 A1 | 10/2020 | Dahan et al. | |
| 2021/0194778 A1* | 6/2021 | Tidemann | H04L 45/124 |

* cited by examiner

*Primary Examiner* — Joshua Joo

(57) ABSTRACT

A method, a device, and a non-transitory storage medium are described in which a polymorphic algorithm-based network slice orchestrator service is provided. The service may manage network slices based on radio access network performance metrics, core network performance metrics, network slice performance metrics, a machine learning framework, and polymorphic algorithms. The service may be applied to a multi-tier network. The service may include management of a data network access point of the network slice on a per-tier basis.

20 Claims, 11 Drawing Sheets

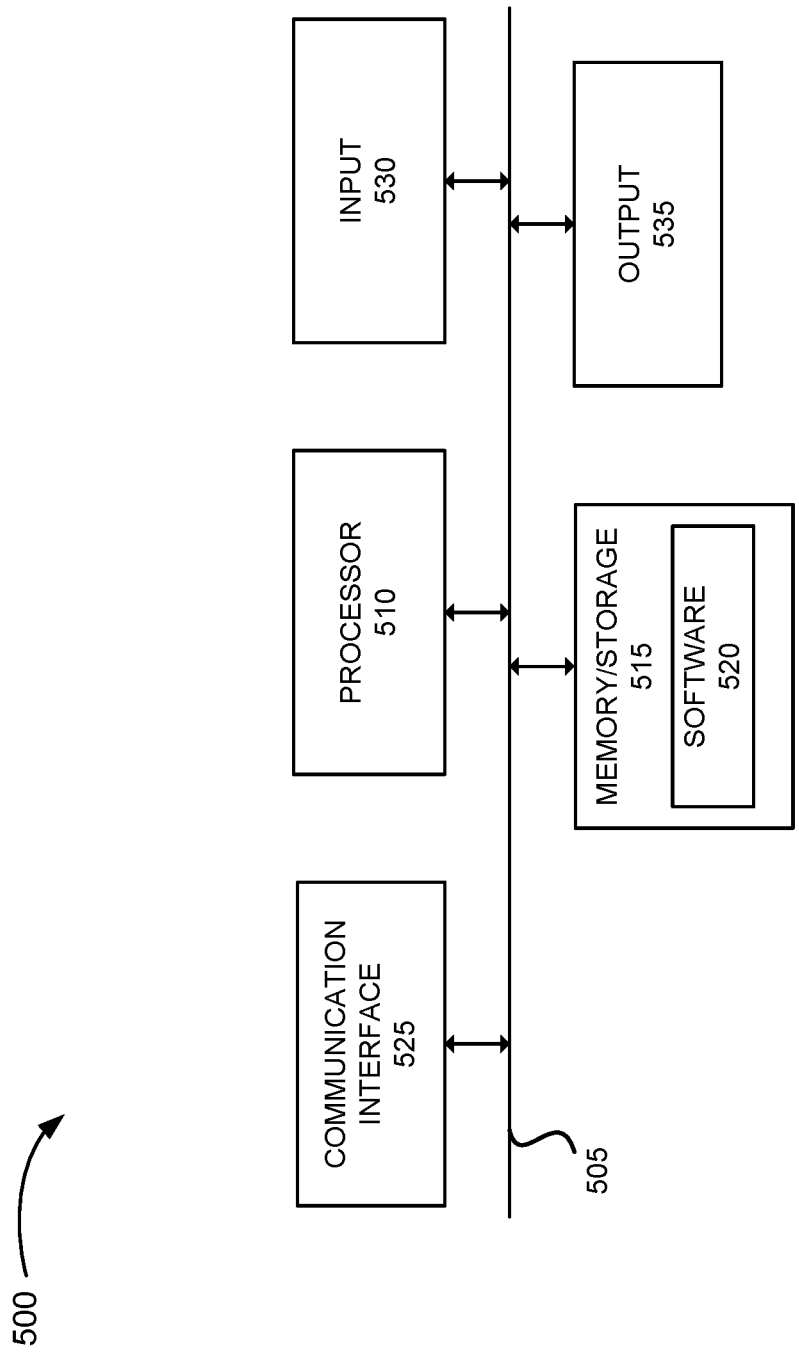

METHOD AND SYSTEM FOR POLYMORPHIC ALGORITHM-BASED NETWORK SLICE ORCHESTRATION

CROSS REFERENCE TO RELATED APPLICATION

This patent application is a continuation of U.S. patent application Ser. No. 16/823,952, entitled "METHOD AND SYSTEM FOR POLYMORPHIC ALGORITHM-BASED NETWORK SLICE ORCHESTRATION" and filed on Mar. 19, 2020, the disclosure of which is incorporated herein by reference in its entirety.

BACKGROUND

Development and design of networks present certain challenges from a network-side perspective and an end device perspective. For example, Centralized Radio Access Network (C-RAN) and Open Radio Access Network (O-RAN) architectures have been proposed to satisfy the increasing complexity, densification, and demands of end device application services of a future generation network.

BRIEF DESCRIPTION OF THE DRAWINGS

FIG. 5 is a diagram illustrating exemplary components of a device that may correspond to one or more of the devices illustrated and described herein.

DETAILED DESCRIPTION OF PREFERRED EMBODIMENTS

Figure 1:
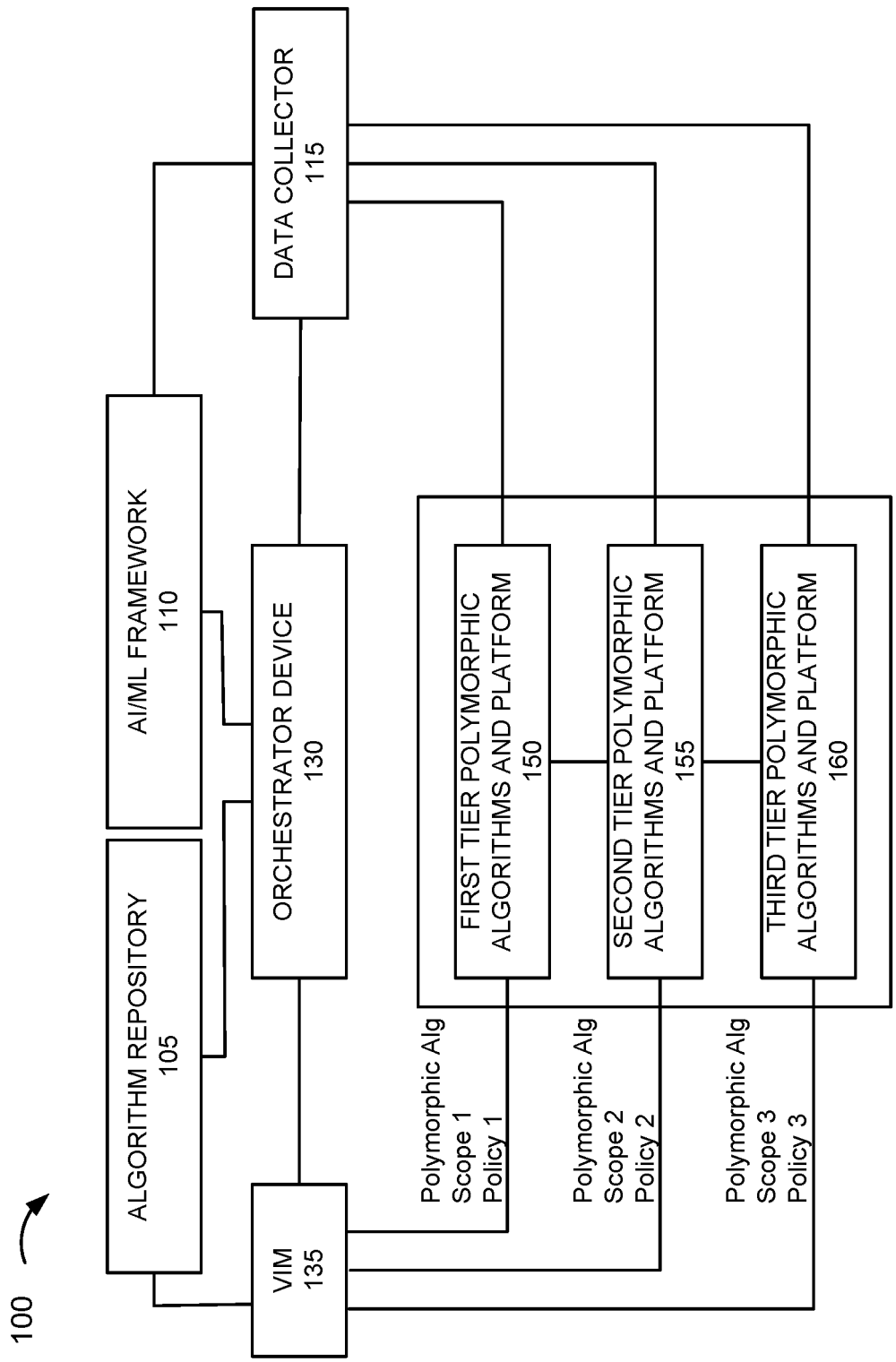
FIG. 1 is a diagram illustrating an exemplary system in which an exemplary embodiment of a polymorphic algorithm-based network slice orchestrator service may be implemented.

The following detailed description refers to the accompanying drawings. The same reference numbers in different drawings may identify the same or similar elements. Also, the following detailed description does not limit the invention.

The development and design of next generation wireless networks may be based on cloud technologies, software defined networking (SDN), and network function virtualization (NFV). Ubiquitous automation, network slicing, machine learning (ML), artificial intelligence (AI), closed loop service assurance, self-healing, self-configuring, and other network attributes and/or services may be integral aspects of the next generation network. The next generation network may include a RAN and a core network, and perhaps other types of networks, such as a service and/or application layer network, a cloud network, a multi-access edge computing (MEC) network, and so forth.

The O-RAN Reference Architecture includes a non-real time RAN Intelligent Controller (MC), a near-real-time MC, various open interfaces (e.g., O1, A1, E2, open fronthaul interface, etc.), interoperability with standard interfaces (e.g., Third Generation Partnership Project (3GPP) interfaces, such as F1, W1, E1, X2, Xn, etc.), open network devices (e.g., O-RAN Centralized Unit (O-CU), O-RAN Distributed Unit (O-DU), O-RAN next generation Node B (O-gNB), O-RAN evolved Node B (O-eNB, etc.), white box hardware, and open source software. The hierarchical RICs may include ML models and/or AI components. The control functionality of the non-real-time RIC relates to a non-real-time timeframe and the control functionality of the near real-time RIC relates to a near real-time timeframe. Messages generated from AI-enabled policies and ML-based models of the non-real-time MC may be communicated to the near-real-time MC.

Centralized and distributed algorithms that may operate in different time domains, and may relate to different complexities, network nodes, data sets, inputs, and outputs may not have any correlation with each other. Given this framework, another entity may be used to coordinate and harmonize decisions for a given goal, such as optimization or another criterion. However, the harmonization of these types of algorithms having different time granularities and scopes (e.g., type and number of nodes), among other things, towards a common optimization is non-trivial, and can result in high communication latencies due to high transactional velocities between these algorithms for coordination. Further, the configuration of an AI and/or ML framework that manages these algorithms having different goal functions with an aim toward maximizing a yield across the network is problematic.

The performance of a network slice may be reliant on multiple networks, such as the radio access network, the core network, and perhaps the application service layer network, and various criteria and factors, such as rendering the network slice, carrier aggregation of a device, radio quality, cell-level congestion, latency associated with the core network, Transmission Control Protocol (TCP) flow control, aggregation point for the traffic being sourced for the network slice, reaction to dynamism in the RAN and/or the core network, among other things. Currently, even though there may be dynamic instantiation of an application at a MEC network or other type of application service layer network, the analytics used to make such a determination are mostly static. There is also a lack of stateful associations between the core network and MEC traffic instances because the traffic is flow-based (e.g., traffic type) and the granularity is not per user device. There is also a disassociation between that RAN and core network that pertains to network slice management. Decisions for a MEC network or some other centralized traffic end point may be statically provisioned and configured based on a priori information. Additionally, different granularities for network slice management may occur depending on whether a network slice is configured for one-to-many devices or one per device-type, which may in turn require different stateful associations.

According to exemplary embodiments, a polymorphic algorithm-based network slice orchestrator service is described. According to an exemplary embodiment, a network provides the polymorphic algorithm-based network slice orchestrator service. The network may include a wireless network, a self-organizing network (SON), an O-RAN-based network, a wired network, a virtual network (e.g., a virtualized RAN (vRAN)), a core network, and/or another type of network, for example. According to an exemplary embodiment, the network may include a multi-tier or hierarchical framework. For example, the network may include a three-tiered framework, which may include a centralized tier, an edge tier, and a far edge tier. According to other examples, the network may include a different number of tiers (e.g., two-tiered, four-tiered, etc.) and/or different types of tiers.

According to an exemplary embodiment, the polymorphic algorithms may be directed towards optimizing different metrics pertaining to network slicing, as described herein. According to an exemplary embodiment, the polymorphic algorithms of a metric may have the same goal function across different tiers of the network but may operate according to different time granularities. In this way, the polymorphic algorithm-based network slice orchestrator service provides a goal function normalization (e.g., standardize the measure of the algorithm yield) among polymorphic algorithms of the same metric type. The time granularities may be configurable (e.g., non-real-time, near real-time, real-time, and/or other types of time periods). As an example, the time granularity of the polymorphic algorithm of a metric type at node level (e.g., at a third tier of the network) may operate at time granularities in seconds or milliseconds, while the time granularities of the polymorphic algorithm of the metric type across a group of nodes (e.g., at a second tier of the network) may operate at time granularities in seconds or minutes, and the time granularities of the polymorphic algorithm of the metric type across a centralized infrastructure of the network (e.g., at a first tier of the network) may operate at time granularities in hours or days.

According to an exemplary embodiment, the network may include a slice orchestrator or other type of controller device (referred to herein as an orchestrator device) that provides the polymorphic algorithm-based network slice orchestrator service. According to an exemplary embodiment, the orchestrator device may manage the execution of the polymorphic algorithms pertaining to network slices across each tier of the network. For example, the orchestrator device may manage the polymorphic algorithms, such as at node level, at a group of nodes level, and at a centralized level of the network, and/or another type of configurable scope.

According to an exemplary embodiment, the orchestrator device may allow the polymorphic algorithms of a metric to operate in a single tier of the network and its associated time granularity, as described herein. For example, for any given node or group of nodes of the network, a polymorphic algorithm of a metric type may be active in only a single tier of the network. That is, multiple instances of the polymorphic algorithm of a metric type may not be active in multiple tiers of the network for a given node or group of nodes. In this regard, for example, in a three-tiered network, the polymorphic algorithm scope for a cell or a cluster of cells or the network may be mutually exclusive such that (Scope (tier 1))∩(Scope (tier 2))∩(Scope (tier 3))==Null. So at a lowest denomination of the network (e.g., at a node level), there may be only one polymorphic algorithm supervising the node from tier 1, tier 2, or tier 3 of the network. According to an exemplary embodiment, the orchestrator device may manage the transition of the polymorphic algorithms of the metric type to operate in another tier and associated time granularity.

According to an exemplary embodiment, the orchestrator device may manage traffic aggregation devices of network slices associated with a network. For example, the orchestrator device may determine at what tier of the network a packet gateway (PGW) device or a user plane function (UPF) device may operate for a given network slice, as well as other aspects of the lifecycle of the PGW device, the UPF device, or other type of data network aggregation point (DNAP). According to an exemplary embodiment, the orchestrator device may manage application layer devices of network slices. For example, the orchestrator device may manage the lifecycle of a host device, a virtual entity of the host (e.g., a container, a virtual machine, etc.) that provides an application or a service relating to the network slice, or a proxy device. Similar to the traffic aggregation devices, the orchestrator device may manage the location (e.g., tier of the network) at which the application layer device may operate. In some instances, the host device or the virtual entity may be located in a network external to the network managed by the orchestrator device. For example, the host device or the virtual entity may be located in a MEC network, the Internet, or other type of application layer network. The orchestrator device may still manage the traffic aggregation device or proxy device. Alternatively, as described herein, the orchestrator device may include the management of the application layer network. A network slice may be associated with various types of information (e.g., Single Network Slice Selection Assistance Information (S-NSSAI), etc.).

The orchestrator device may also provide service orchestration, network slice management (e.g., lifecycle management, such as instantiation, deletion, modification, etc.), and flow management. As described herein, the orchestrator device may also obtain network slice parameters pertaining to performance (e.g., reliability, latency, throughput, etc.), RAN performance metrics (e.g., cell and cluster performance, etc.), and core performance metrics (e.g., congestion, flow control, etc.).

According to an exemplary embodiment, the polymorphic algorithm-based network slice orchestrator may operate in various modes. For example, the various modes may include a proactive mode and a reactive mode, as described herein. According to an exemplary embodiment, the polymorphic algorithm-based network slice orchestrator service may enable an AI framework to monitor the effectiveness of the polymorphic algorithms and their execution at different tiers of the network based on reinforcement learning. The AI framework may also allow information regarding polymorphic algorithm performance to be shared for potential collaboration between different polymorphic algorithms.

In view of the foregoing, the polymorphic algorithm-based network slice orchestrator service may optimize the allocation and use of network resources to achieve an optimization or network performance target relating to network slices of a network. For example, the optimization may relate to resources and management of a RAN, core traffic management (e.g., traffic aggregation devices, application layer devices), and perhaps a MEC network.

The polymorphic algorithm-based network slice orchestrator service may also provide low churn by re-using the same algorithms across multiple tiers of the network, albeit at different time granularities, based on virtualization. The polymorphic algorithm-based network slice orchestrator service may also reduce the complexities of the AI and/or ML framework and the ability to manage coordination in the network based on the goal function normalization. The polymorphic algorithm-based network slice orchestrator service may also reduce the resource load by executing a polymorphic algorithm of a metric type at a given tier of the network only when necessary and on a single-tier basis, as described herein. In this way, the polymorphic algorithm-based network slice orchestrator service may provide scope reduction and singularity based on reducing the number of polymorphic algorithm instances of the same metric type executing with the same objective across multiple tiers of the network.

The polymorphic algorithm-based network slice orchestrator service may also improve the management of network slice metrics (e.g., latency, reliability, throughput, Quality of Service (QoS), Key Performance Indicator (KPI), Quality of Experience (QoE) score, Mean Opinion Score (MOS), etc.), network slice life-cycle (e.g., instantiation, monitoring, deletion, adaptation, and other provisioning facets) and other attributes or performance-related issues of the network based on the common goal functions of the polymorphic algorithms across multiple tiers of the network, the AI and/or ML framework (e.g., learned model inputs, policies, etc.), traffic aggregation point and application layer management, single-tier configuration and optimization strategies (e.g., tier-based optimization and configuration working across various time granularities to obtain an optimal yield) that may be applied.

FIG. 1 is a diagram illustrating an exemplary system 100 in which an exemplary embodiment of the polymorphic algorithm-based network slice orchestrator service may be implemented. As illustrated, system 100 includes an algorithm repository 105, an AI/ML framework 110, a data collector 115, an orchestrator device 130, a virtualized infrastructure manager (VIM) 135, a first tier polymorphic algorithms and platform 150, a second tier polymorphic algorithms and platform 155, and a third tier polymorphic algorithms and platform 160. According to other exemplary embodiments of system 100, multiple network devices may be combined into a single network device. For example, orchestrator device 130 may include AI/ML framework 110 and/or algorithm repository 105. Additionally, or alternatively, a single network device may be implemented as multiple network devices in which a process or a function may be collaboratively performed or multiple processes or functions may be split between them. For example, orchestrator device 130 may be implemented to include an orchestrator device that manages network slices, and another orchestrator device that manages the polymorphic algorithms. Other variations of system or environment 100 may be implemented.

The number, the type, and the arrangement of network devices illustrated in system 100 are exemplary. A network device, a network element, or a network function (referred to as a network device) may be implemented according to one or multiple network architectures, such as a client device, a server device, a peer device, a proxy device, a cloud device, and/or a virtualized network device. Additionally, a network device may be implemented according to various computing architectures, such as centralized or distributed, and may be incorporated into various types of network architectures (e.g., SDN, SON, virtual, logical, network slice, wireless, wired, etc.).

The virtualization technologies and/or virtual network devices described in relation to system 100 are also exemplary. For example, a virtual network device may include a virtualized network function (VNF), a server device, a host device, a container, a hypervisor, a virtual machine (VM), a network function virtualization infrastructure (NFVI), a network function virtualization orchestrator (NFVO), a virtual network function manager (VNFM), a platform manager and/or other types of virtualization elements, layers, hardware resources, operating systems, engines, etc.

System 100 includes communication links between the network devices. System 100 may be implemented to include wired, optical, and/or wireless communication links. A communicative connection via a communication link may be direct or indirect. For example, an indirect communicative connection may involve an intermediary network device not illustrated in FIG. 1. A direct communicative connection may not involve an intermediary network device. The number and the arrangement of communication links illustrated in system 100 are exemplary.

System 100 may include various planes of communication including, for example, a control plane, a service plane, a data plane, and/or a network management plane. System 100 may include other types of planes of communication. A message communicated in support of the polymorphic algorithm-based network slice orchestrator service may use at least one of these planes of communication. Additionally, an interface of a network device may be modified (e.g., relative to an interface defined by a standard, such as 3GPP, International Telecommunication Union (ITU), European Telecommunications Standards Institute (ETSI), GSM Association (GSMA), O-RAN, etc.) or a new interface of the network device may be provided in order to support the communication (e.g., transmission and reception of messages, information elements (IE), attribute value pairs (AVPs), etc.) between network devices that support the polymorphic algorithm-based network slice orchestrator service, as described herein. According to various exemplary implementations, the interface of a network device may be a service-based interface, a reference point-based interface, or an O-RAN interface.

Algorithm repository 105 may include a network device that stores polymorphic algorithms that relate to various optimization objectives and/or performance metrics pertaining to a network and/or a network slice. The polymorphic algorithms of an optimization objective and/or performance metric may share a normalized goal function across different time granularities and associated tiers of a network. Additionally, according to an exemplary embodiment, the polymorphic algorithms of an optimization objective and/or performance metric may apply the same logic and may use the same inputs, and outputs, albeit at different time granularities. In this way, the polymorphic algorithms may operate in different tiers of a network and provide a consistent goal function. Additionally, such a framework may ensure that the polymorphic algorithms may transition between tiers of a network, enable an AI/ML framework to control sequencing of the polymorphic algorithms in terms of optimization objectives and/or performance metrics and transitioning between tiers, reduce the number of disparate algorithms (e.g., in terms of input/output, optimization logic, goal functions, etc.), and minimize the complexity for management and coordination.

To enforce algorithm singularity based on polymorphism, the polymorphic algorithms of an optimization objective and/or performance metric may include certain features pertaining to their input and their output. For example, the input of the polymorphic algorithms may include a time granularity profile that determines a tier of the network on which the polymorphic algorithm operates, a validity of profile (e.g., a duration for which the profile is valid), a goal function aggregation duration, exit criteria events, such as yield criterion (e.g., converge, diverge), time-series criterion (e.g., transient threshold), error scenario handling, and fidelity and manifest to enable and disable. Additionally, for example, the output of the polymorphic algorithms may include a goal function scaling per network tier, a goal-to-yield realization, a self convergence check (e.g., using ML), a self assurance check (e.g., using ML), and an output profile format per time granularity profile.

According to an exemplary embodiment, the polymorphic algorithms may relate to self-configuring, self-optimizing, and/or self-healing. Within these genres, the polymorphic algorithms may include context algorithms (e.g., type of cell/sector/site, indoor, dense, urban, etc.), mobility algorithms (e.g., stationary, mobile, speed, direction of end device, etc.), coverage algorithms (e.g., geographic area, cell, sector, a network slice associated with a wireless service, a RAN device, a core device, and/or another type of network device (e.g., a traffic aggregation point device, an application layer device, etc.) or group thereof of the network, etc.), quality algorithms (e.g., bit rates, latency, throughput, reliability), and/or other performance metrics (e.g., QoS, KPI, MOS, QoE, etc.) associated with a network slice, a RAN device, a core device, another type of network device or group thereof of the network, etc.), capacity algorithms (e.g., number of users and/or application services supported by a cell, a sector, a network slice, a RAN device, a core device, and/or another type of network device or group thereof of the network, etc.), and energy algorithms (e.g., turn off a cell or sector, provide other energy conservation mechanisms that may minimize energy usage of a RAN device, a core device, a network slice, another type of network device, or group thereof of the network). The projected yield of the network and/or a network slice may be calculated based on the amount of spectrum, how the resources are being utilized by the device types and services offered, network slices being serviced at RAN devices, core devices, application layer devices, etc., and other factors. RAN and core optimization, and network slice optimization may be orchestrated by the autonomous AI/ML framework 110 and orchestrator device 130 in view of the polymorphic algorithms.

AI/ML framework 110 may include a network device that includes AI and/or ML logic. For example, AI/ML framework 110 may include various learning-based and/or intelligence logic, such as reinforcement-based learning, unsupervised learning, semi-supervised learning, supervised learning, deep learning, artificial intelligence, and/or other types of device intelligence (referred to herein as "machine learning). AI/ML framework 110 may analyze output data from first tier polymorphic algorithms and platform 150, second tier polymorphic algorithms and platform 155, and third tier polymorphic algorithms and platform 160 via data collector 115 to determine whether a goal function is being met based on policies (e.g., related to thresholds, triggers, etc.) and various analytical assessments (e.g., related to traffic patterns, cost function, time-series, telemetry, network location, anomalies, etc.) to optimize and/or reach a performance target in relation to nodes of a tier of the network and/or network slices.

Data collector 115 may include a network device that collects output data from first tier polymorphic algorithms and platform 150, second tier polymorphic algorithms and platform 155, and third tier polymorphic algorithms and platform 160. The output data may relate to various network devices of a RAN, which may include RAN devices, and core devices and/or application layer devices, as described herein.

Orchestrator device 130 may include a network device that orchestrates the polymorphic service provided by first tier polymorphic algorithms and platform 150, second tier polymorphic algorithms and platform 155, and third tier polymorphic algorithms and platform 160 via VIM 135. Orchestrator device 130 may orchestrate virtual instances of the polymorphic algorithms at various tiers of the network, such as instantiation, deletion, suspension, transition to another tier, etc., based on feedback from AI/ML framework 110, policies, and goals/cost functions pertaining to the various types of polymorphic algorithms. The policies may include tier configuration policies, which may be driven by AI/ML framework 110, for selecting the polymorphic algorithm type and radio access nodes, cluster of radio access nodes, cell, sector, etc. Additionally, the policies may include tier exit criterion policies. For example, the tier exit policies may include static triggers and trigger thresholds for a radio access node, a cluster of radio access nodes, or some other grouping of nodes. In this way, a threshold or a rule involving the threshold within a policy may indicate how and when a polymorphic algorithm may automatically transition from one tier to another tier of the network, for example. Orchestrator device 130 may also orchestrate virtual instances of RAN devices, core devices, and/or application layer devices at various tiers of the network, as described herein.

Orchestrator device 130 may monitor network slice performance (e.g., RAN and core telemetry) at various time granularities, and may use predictive ML/AI models, polymorphic algorithms, and other information (e.g., context information, etc.), as described herein, for network slice orchestration of network resources (e.g., cell, sector, network device, clusters or groups of network devices, etc.). Orchestrator device 130 may assess radio optimization states and core network congestion states to determine how to handle a network slice for a cell, a cluster or group of network devices, and where, when, and how to run a DNAP (e.g., via a MEC). Orchestrator device 130 may also use radio network and core network optimization routines to ensure that a network slice is satisfying performance constraints and demands (e.g., as indicated in a service level agreement). Based on a virtualization framework, orchestrator device 130 may aggregate and disaggregate network slice management at various tiers of the network (e.g., cluster, cell, sector, network device, cluster or group of network devices, cells, sectors, etc.), and manage a disaggregated network slice objectively, with an awareness of the overall performance metric of the network slice. Orchestrator device 130 may orchestrate network slice configurations across different tiers of the network based on learned AI/ML models, and orchestrate network slice management using polymorphic algorithms across tiers in a mutually exclusive and contention-less manner. Orchestrator device 130 may alter routing to a DNAP based on triggers which may be subject to transient changes in the network, such as RAN deficiencies and core network deficiencies (e.g., congestion, etc.), for example. Orchestrator device 130 in combination with other network devices (e.g., AI/ML framework 110, polymorphic platforms 150, 155, and 160, etc.) may ensure a consistent level of service provided by network slices based on yield and goal functions, convergence, and divergence factors, among other things, associated with context, time, and tier of network, and may maximize the yield for a network slice by predicting the network tier and time granularity for a network slice management entity.

VIM 135 may include a network device that controls and manages compute, storage, and network resources of an NFV Infrastructure (NFVI) that support the polymorphic algorithms operating at a tier of the network by first tier polymorphic algorithms and platform 150, second tier polymorphic algorithms and platform 155, and third tier polymorphic algorithms and platform 160. VIM 135 may manages the types of polymorphic algorithms operating and their state based on communications with orchestrator device 130 and algorithm repository 105.

First tier polymorphic algorithms and platform 150 includes network devices that host polymorphic algorithms. For example, first tier polymorphic algorithms and platform 150 may include one or multiple virtualization technologies, as described herein. According to an exemplary embodiment, the polymorphic algorithms of the first tier may operate at a longer time granularity relative to the second tier and the third tier. First tier polymorphic algorithms and platform 150 may also have a different scope (e.g., virtual network core) than the scopes of the second tier and the third tier, as described herein.

Second tier polymorphic algorithm and platform 155 includes network devices that host polymorphic algorithms. For example, second tier polymorphic algorithms and platform 155 may include one or multiple virtualization technologies, as described herein. According to an exemplary embodiment, the polymorphic algorithms of the second tier may operate at a longer time granularity relative to the third tier. Second tier polymorphic algorithms and platform 155 may also have a different scope (e.g., virtual network edge) than the scopes of the first tier and the third tier, as described herein.

Third tier polymorphic algorithms and platform 160 includes network devices that host polymorphic algorithms. For example, third tier polymorphic algorithms and platform 160 may include one or multiple virtualization technologies, as described herein. According to an exemplary embodiment, the polymorphic algorithms of the third tier may operate at a shorter time granularity relative to the first tier and the third tier. Third tier polymorphic algorithms and platform 160 may also have a different scope (e.g., virtual network far edge) than the scopes of the first tier and the third tier, as described herein.

Figure 2:
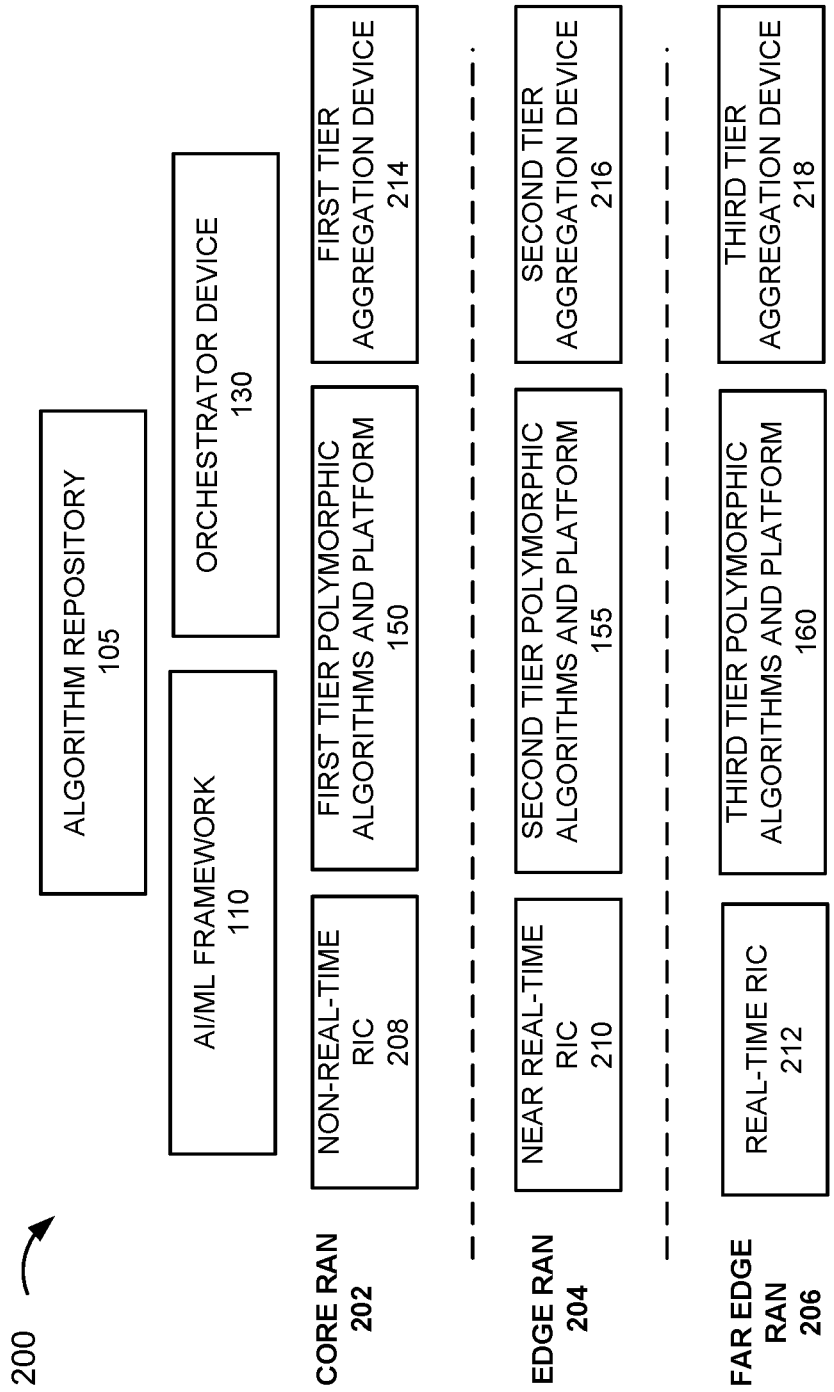
FIG. 2 is a diagram illustrating another exemplary environment in which an exemplary embodiment of the polymorphic algorithm-based network slice orchestrator service may be implemented.

FIG. 2 is a diagram illustrating an exemplary environment in which the polymorphic algorithm-based network slice orchestrator service may be implemented in a network. As illustrated, a network 200 may include a core RAN 202, an edge RAN 204, and a far edge RAN 206 that correspond to different tiers of the network.

Core RAN 202 may include algorithm repository 105, AI/ML framework 110, orchestrator device 130, first tier polymorphic algorithms and platform 150, a non-real-time RAN Intelligent Controller (MC) 208, and a first tier aggregation device 214. Non-real-time MC 208 may support non-real-time intelligent radio resource management, higher layer procedure optimization, and policy optimization in a RAN. For example, non-real-time MC 208 may control and optimize various radio resources, such as network slicing associated with a 5G or future RAN, or radio bearers associated with a 4G RAN. First tier aggregation device 214 may include a centralized traffic aggregation device. First tier aggregation device 214 may include a RAN device (e.g., CU-User Plane (CU-UP), CU-Control Plane (CU-CP), etc.), and/or a core device (e.g., a PGW device, a UPF device, etc.). First tier aggregation device 214 may include an application layer device, such as a virtual network device (e.g., a server device, a host device, a container, a VM, etc.). First tier aggregation device 214 may be configured on a per slice or per service basis, for example.

Edge RAN 204 may include second tier polymorphic algorithms and platform 155 a near real-time RIC 210, and a second tier aggregation device 216. Near real-time MC 210 may support near real-time intelligent radio resource management, QoS management, connectivity management, and handover management in a RAN. For example, near real-time MC 210 may control and optimize various radio resources, such as the selection of radio access devices (e.g., evolved Node B (eNB), a CU, a next generation Node B (gNB), etc.) associated with a 4G, 5G, or future RAN. Second tier aggregation device 216 may include a RAN device and/or a core device. Second tier aggregation device 216 may include an application layer device. Second tier aggregation device 216 may be configured on a per slice or per service basis, for example.

Far edge RAN 206 may include third tier polymorphic algorithms and platform 160, a real-time RIC 212, and a third tier aggregation device 218. Real-time RIC 212 may support real-time intelligent radio resource management. For example, real-time RIC 212 may control and optimize various radio resources of radio access devices (e.g., eNB, radio unit (RU), remote radio head (RRH), etc.), gNB, distributed unit (DU), etc.) associated with a 4G, 5G, or future RAN, radio resource scheduling for uplink and downlink communication with an end device, and radio signal characteristics (e.g., modulation, beam management, etc.). Third tier aggregation device 218 may include a RAN device and/or a core device. Third tier aggregation device 218 may include an application layer device. Third tier aggregation device 218 may be configured on a per slice or per service basis, for example. According to an exemplary embodiment, the polymorphic algorithm-based network slice orchestrator service may be implemented in an O-RAN architecture or another type of radio access network. The number of tiers of network 200 is exemplary.

For the sake of description, although not illustrated, system 100 may manage a RAN, a core network, and perhaps other networks (e.g., a backhaul network, a fronthaul network, an application layer network, etc.). The RAN may include one or multiple networks of one or multiple types and technologies. For example, the RAN may be implemented to include a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), a RAN of an LTE-A Pro network, a next generation RAN (e.g., a Fifth Generation (5G)-access network (5G-AN) or a 5G-RAN (referred to herein as simply a 5G-RAN)), another type of future generation RAN, and/or another type of RAN (e.g., a legacy Third Generation (3G) RAN, etc.). The RAN may communicate with other types of access networks, such as, for example, a WiFi network, a Worldwide Interoperability for Microwave Access (WiMAX) network, a local area network (LAN), a Citizens Broadband Radio System (CBRS) network, a cloud RAN, a wired network (e.g., optical, cable, etc.), an optical network, or another type of network that provides access to or can be used as an on-ramp to the RAN, a core network, and/or a MEC network, for example.

The RAN may include different and multiple functional splitting, such as options 1, 2, 3, 4, 5, 6, 7, or 8 that relate to combinations of the RAN and a core network including an Evolved Packet Core (EPC) network and/or a NG core (NGC) network, or the splitting of the various layers (e.g., physical layer, Media Access Control (MAC) layer, Radio Link Control (RLC) layer, and Packet Data Convergence Protocol (PDCP) layer), plane splitting (e.g., user plane, control plane, etc.), a CU, a DU, interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service.

The RAN may be implemented to include various architectures of wireless service, such as, for example, macrocell, microcell, femtocell, picocell, metrocell, new radio (NR) cell, LTE cell, non-cell, or another type of cell architecture. Additionally, according to various exemplary embodiments, the RAN may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 Gigahertz (GHz), above 6 GHz, licensed radio spectrum, unlicensed radio spectrum, etc.), and/or other attributes or technologies used for radio communication.

Depending on the implementation, the RAN may include one or multiple types of network devices, such as RAN devices. For example, the RAN devices may include an eNB, a gNB, an evolved Long Term Evolution (eLTE) eNB, a radio network controller (RNC), a remote radio head (RRH), a baseband unit (BBU), a CU, a DU, a small cell node (e.g., a picocell device, a femtocell device, a microcell device, a home eNB, etc.), a future generation wireless access device, another type of wireless node (e.g., a WiFi device, a WiMax device, a hotspot device, etc.) that provides a wireless access service, or other another type of network device that provides a transport service (e.g., routing and forwarding), such as a router, a switch, or another type of layer 3 (e.g., network layer of the Open Systems Interconnection (OSI) model) network device. Additionally, or alternatively, the RAN devices may include wired and/or optical devices (e.g., modem, wired access point, optical access point, Ethernet device, etc.) that provide network access. According to some exemplary embodiments, the RAN devices may include O-RAN access devices and O-RAN interfaces.

A core network may include one or multiple networks of one or multiple network types and technologies. The core network may include a complementary network of the RAN. For example, the core network may be implemented to include an Evolved Packet Core (EPC) of an LTE, an LTE-A, an LTE-A Pro, a next generation core (NGC) network, and/or a future generation core network. The core network may include a legacy core network.

Depending on the implementation, the core network may include various types of core devices. For example, the core devices may include a mobility management entity (MME), a PGW, a serving gateway (SGW), a home subscriber server (HSS), an authentication, authorization, and accounting (AAA) server, a policy charging and rules function (PCRF), a charging system (CS), a UPF, an access and mobility management function (AMF), a session management function (SMF), a unified data management (UDM) device, an authentication server function (AUSF), a network slice selection function (NSSF), a network repository function (NRF), a network exposure function (NEF), a policy control function (PCF), a network data analytics function (NWDAF), a lifecycle management (LCM) device, and/or an application function (AF). According to other exemplary implementations, the core network may include additional, different, and/or fewer network devices than those described. For example, the core devices may include a non-standard and/or a proprietary network device, or another type of network device that may be well-known but not particularly mentioned herein.

Figure 3A:
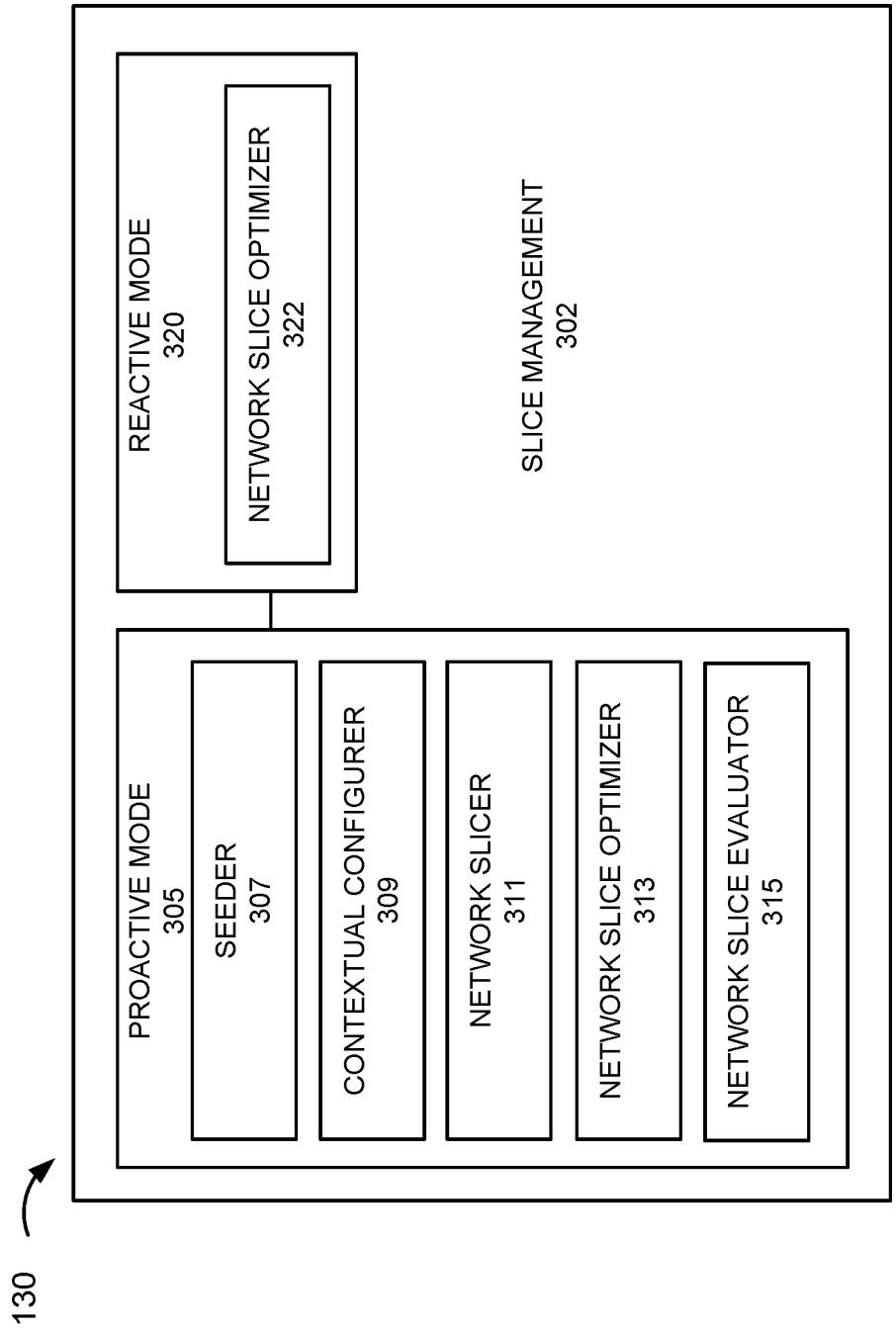
FIG. 3A is a diagram illustrating an exemplary components of an orchestrator device that provides an exemplary embodiment of the polymorphic algorithm-based network slice orchestrator service.

FIG. 3A is a diagram illustrating exemplary component of orchestrator device 130. As illustrated, orchestrator device 130 may include a seeder 307, a contextual configurer 309, a network slice optimizer 313, a network slice evaluator 315, and a network slice optimizer 322. According to some exemplary embodiments, as illustrated, components may be associated with a proactive mode 305 or a reactive mode 320 of operation by orchestrator device 130. According to other exemplary embodiments, the exemplary components illustrated and described may not relate to a mode of operation. Orchestrator device 130 may include additional, fewer, and/or different modes of operation. According to other exemplary embodiments, multiple components may be combined into a single component. Additionally, or alternatively, a single component may be implemented as multiple components in which a process or a function may be collaboratively performed or multiple processes or functions may be split between them.

Seeder 307 may include logic that identifies contextual information pertaining to a sector, a cell, a network device, a group of network devices, cells, and/or sectors. For example, the contextual information may include traffic patterns (e.g., high volume, low volume, medium volume, etc.), types of users (e.g., highly mobile, stationary, moderately mobile, etc.), service area characteristics (e.g., dense, urban, suburban, rural, outdoors, indoors, etc.), application types (e.g., real-time, critical, Internet of Things (IoT), ultra-reliable, broadcast-like, etc.), time and day information (e.g., time of day, day of week, daytime, evening, etc.), and/or other characteristics (e.g., congestion, etc.) pertaining to wireless service and/or network slices of the network. Seeder 307 may include logic that identifies the sector, the cell, the network device, or groups or clusters of network devices, cells, and/or sectors of relevance based on the contextual information and associated deterministic signatures. Seeder 307 may select locations for aggregation devices (e.g., DNAP, core device, etc.) and application layer devices in support of network slices and wireless service based on the contextual information and associated deterministic signatures.

Contextual configurer 309 may include logic that generates a profile for each tier of the network based on the contextual information and associated deterministic signatures. The profile may include initial or default parameters and values that relate to network slice configurations. For example, the network slice configurations may relate to mobility, coverage, quality, capacity, and energy associated with network slices and their optimization. The profile may also include policies and performance targets that may manage network slices, the transitioning between tiers, and lifecycle management of RAN, core, and application layer devices. Contextual configurer 309 may also assign thresholds and/or other types of configurations that may govern a mode of operation of orchestrator device 130 relating to a network slice or portion thereof. For example, for a network device, a network slice, a group of network devices, and/or a network tier basis, orchestrator device 130 may manage resources (e.g., network devices, communication links, etc.), associated functions of network devices, and wireless and/or application services according to a proactive mode or a reactive mode of operation. By way of further example, a threshold configuration may trigger the use of a reactive algorithm which may cause network resources to move from edge RAN 204 to far edge RAN 206, instantiate traffic aggregation devices at far edge RAN 206, and/or some other reactive measure to satisfy performance metrics of a network slice or application service.

Network slicer 311 may include logic that manages a lifecycle of a network slice. For example, network slice 311 may instantiate, delete, suspend, modify, and/or perform some other operation relative to a network slice and associated application service. Network slicer 311 may manage the network slice based on inputs from other components of orchestrator device 130 (e.g., seeder 307, contextual configurer 309, etc.) and/or other network devices of the polymorphic algorithm-based network slice orchestrator service (e.g., AI/ML framework 110, platforms 150, 155, and 160, etc.). Network slicer 311 may also include logic that may manage network devices of the network slice, such as a RAN device, a core device, a DNAP, and perhaps other network devices (e.g., an application layer device), as described herein. The management of the network device of the network slice may include lifecycle management, management of location in network, management of transition between tiers of the network, and so forth.

Network slice optimizer 313 may include logic that identifies RAN and core optimization states and to optimize network slice performance and underlying performance of network devices of a tier relevant to the network slice. Network slice optimizer 313 may adjust the profiles of contextual configurer 309 based on output from AI/ML framework 110 and network slice evaluator 315, as well as other information (e.g., contextual information, assigned profiles, etc.). Network slice optimizer 313 may include RAN optimization algorithms and core optimization algorithms that may provide optimization of network slices and underling resources (e.g., network devices, communication links, etc.). Network slice optimizer 313 may include logic that transitions the execution of a polymorphic algorithm between tiers of the network, alters the location of a traffic aggregation device and/or an application layer device associated with a network slice or application service, alters the type, number, location of RAN and/or core devices, the amount of resources, and/or alterations of other types of configurations of a network slice, for example. Network slice optimizer 313 may also include logic that may alter the mode of operation of orchestrator 130 in relation to a network slice, a tier of the network pertaining to a group of network devices, an individual network device, or other network resources. For example, policies and thresholds may provide that after a certain number of unsuccessful attempts and/or other configurable criteria (e.g., time-based, degree of deficiency of performance, rate of deficiency of performance or divergence, not satisfying a minimum performance metric threshold, etc.) to optimize a network slice or portion thereof in relation to a performance metric, network slice optimizer 313 may pass the optimization to network slice optimizer 322.

Network slice evaluator 315 may include logic that analyzes network slice performance and determines deficiencies in performance associated with network slices, underlying network resources, and tiers of the network. For example, network slice performance may be indicated by network/network slice state information provided by first tier polymorphic algorithms and platform 150, second tier polymorphic algorithms and platform 155, third tier polymorphic algorithms and platform 160. Network slice evaluator 315 may also analyze policies, performance targets, output from AI/ML framework 110, contextual information and/or profiles as a basis to identify problem signatures relating to network slice performance (e.g., latency, reliability, throughput, and/or other configurable performance metric).

Network slice evaluator 315 may include logic that provides RAN and core performance validations for network slices. For example, for network devices of relevance of a network slice and associated tier of the network, network slice evaluator 315 may calculate scores or values relating to performance metrics for optimization. For example, for RAN optimization, as previously mentioned, RAN optimization may include coverage, quality, capacity, mobility, and perhaps other metrics such as energy. Described below are exemplary expressions that may be directed to such RAN optimization calculations. The RAN parameter, such as coverage, quality, capacity, etc., may be normalized.

According to an exemplary implementation, the following exemplary expression may be used to calculate a coverage score for a network slice across one or multiple frequency bands:

$$\Sigma(\text{Coverage\_Score}_{BAND} = Fn(\text{Pathloss, Timing Advance})_{N\_TILE-SLICE} = Fn(\text{Pathloss, Timing Advance})_{TARGET}) \quad (1)$$

According to exemplary expression (1), the arguments for the function Fn( ) may include path loss and/or timing advance (TA). According to other implementations, the expression may include additional or different arguments. $Fn(\ )_{N\_TILE-SLICE}$ relates to the network slice and Fn( ) relates to the performance target.

According to an exemplary implementation, the following exemplary expression may be used to calculate a quality score for a network slice across one or multiple frequency bands:

$$\Sigma(\text{Quality\_Score}_{BAND} = Fn(\text{CQI, MIMO}_{MODE})_{N\_TILE-SLICE} Fn(\text{CQI, MIMO}_{MODE})_{TARGET}) \quad (2)$$

According to exemplary expression (2), the arguments for the function Fn( ) may include channel quality indicator (CQI) and/or Multiple In Multiple Out (MIMO) mode. For example, the MIMO mode may include transmit diversity, open loop, spatial multiplexing (OL-SM), closed loop SM (CL-SM), multi-user MIMO, single antenna port, closed loop Rank 1 with pre-coding, and/or other known (e.g., LTE MIMO modes) or 5G and/or future MIMO modes (e.g., Massive MIMO, etc.). According to other implementations, the expression may include additional or different arguments. $Fn(\ )_{N\_TILE-SLICE}$ relates to the network slice and Fn( ) relates to the performance target.

According to an exemplary implementation, the following exemplary expression may be used to calculate a capacity score for a network slice across one or multiple frequency bands:

$$\Sigma(\text{Capacity\_Score}_{BAND} = Fn(\text{Spectral Efficiency, Throughput})_{N\_TILE-SLICE} = Fn(\text{Spectral Efficiency, Throughput})_{TARGET}) \quad (3)$$

According to exemplary expression (3), the arguments for the function Fn( ) may include spectral efficiency and/or throughput. According to other implementations, the expression may include additional or different arguments. $Fn(\ )_{N\_TILE-SLICE}$ relates to the network slice and Fn( ) relates to the performance target.

According to an exemplary implementation, the following exemplary expression may be used to calculate a mobility score for a network slice across one or multiple frequency bands:

$$\Sigma(\text{Mobility\_Score}_{BAND} = Fn(\text{Mobility State})_{N\_TILE\text{-}SLICE} - Fn(\text{Mobility State})_{TARGET}) \quad (4)$$

According to exemplary expression (4), the arguments for the function Fn( ) may include a mobility state. For example, the mobility state may provide a measure of benefit or degradation associated with mobility. For example, the mobility state may relate to the number of dropped sessions during a handover, a handover success rate, the number of ping-pong handovers, or other parameters in which mobility may influence wireless service performance, network slice performance, handover performance, and so forth. According to other implementations, the expression may include additional or different arguments. $Fn(\ )_{N\_TILE\text{-}SLICE}$ relates to the network slice and Fn( ) relates to the performance target.

For core performance validation, network slice evaluator 315 may calculate core performance metrics relative to network devices of relevance to a network slice. Similarly, the core parameters, such as TCP flow, topology, and/or routing, may be normalized. According to an exemplary implementation, the following exemplary expression may be used to calculate a TCP score (e.g., associated with flow control) for a network slice across one or multiple frequency bands:

$$\Sigma(\text{TCP\_Score}_{SLICE} = Fn(\text{WindowSize, Other TCP Parameter})_{SLICE} - Fn(\text{WindowSize, Other TCP Parameter})_{TARGET}) \quad (5)$$

According to exemplary expression (5), the arguments for the function Fn( ) may include TCP Window Size (e.g., receive window) and/or other TCP parameter (e.g., maximum segment size (MSS), buffer size, congestion window size, and/or other TCP parameters that may impact a TCP flow or other TCP performance). According to other implementations, the expression may include additional or different arguments. $Fn(\ )_{SLICE}$ relates to the network slice and Fn( ) relates to the performance target.

According to an exemplary implementation, the following exemplary expression may be used to calculate a topology and/or routing score for a network slice across one or multiple frequency bands:

$$\Sigma(\text{Topology\_Score}_{BAND} = Fn(\text{Topology Changes, Routing Reliability})_{SLICE} - Fn(\text{Topology Changes, Routing Reliability})_{TARGET}) \quad (6)$$

According to exemplary expression (6), the arguments for the function Fn( ) may include topology change (e.g., switching fabric changes, hop count, outages, etc.) and/or routing reliability. According to other implementations, the expression may include additional or different arguments. $Fn(\ )_{SLICE}$ relates to the network slice and Fn( ) relates to the performance target.

Network slice optimizer 322 may include logic that identifies RAN and core states and to increase network slice performance and underlying performance of network devices of a tier relevant to the network slice. Network slice optimizer 322 may adjust the profiles of contextual configurer 309 based on output from AI/ML framework 110 and network slice evaluator 315, as well as other information (e.g., contextual information, assigned profiles, etc.). Network slice optimizer 322 may include RAN optimization algorithms and core optimization algorithms that may provide optimization of network slices and underling resources (e.g., network devices, communication links, etc.). Network slice optimizer 322 may include logic that transitions the execution of a polymorphic algorithm between tiers of the network, alters the location of a traffic aggregation device and/or an application layer device associated with a network slice or application service, alters the type, number, location of RAN and/or core devices, the amount of resources, and/or alterations of other types of configurations of a network slice, for example.

Network slice optimizer 322 may also include logic that may alter the mode of operation of orchestrator device 130 in relation to a network slice, a tier of the network pertaining to a group of network devices, an individual network device, or other network resources. For example, policies and thresholds may provide that after a certain number of unsuccessful attempts and/or other configurable criteria (e.g., time-based, degree of deficiency of performance, rate of deficiency of performance or divergence, not satisfying a minimum performance metric threshold, etc.) to optimize a network slice or portion thereof in relation to a performance metric, network slice optimizer 322 may notify a network administrator or other personnel. Alternatively, network slice optimizer 322 may alter the mode of operation of orchestrator device 130 to a proactive mode when a performance metric value (e.g., a threshold value, within a range of values, such minimum and maximum values, etc.) is satisfied.

According to some exemplary embodiments, network slice optimizer 322 may be invoked when the performance metric value (e.g., a threshold value, a range of values) is not satisfied, and network slice optimizer 313 may be invoked when the performance metric value is satisfied. According to other exemplary embodiments, the invocation of network slice optimizer 313 and network slice optimizer 322 may be based on other criteria, which may or may not include satisfaction of the performance metric value. The performance metric value may relate to various network devices (e.g., RAN, core, DNAP, application layer, etc.), network slices (e.g., reliability, latency, throughput, and/or other KPIs, QoS, QoE, MOS, etc.), polymorphic algorithm optimizations (e.g., mobility, coverage, quality, capacity, energy, etc.).

Figure 3B:
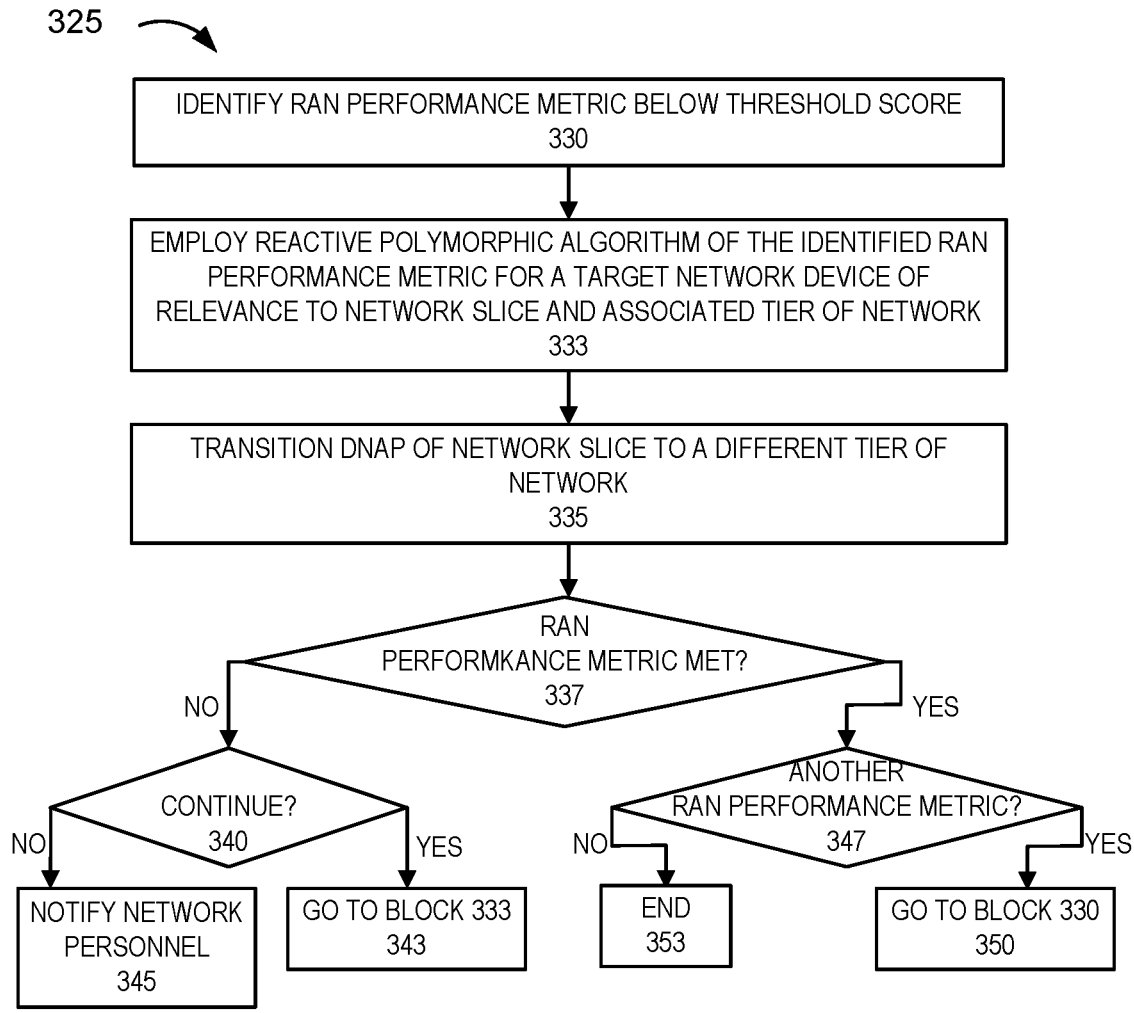
FIG. 3B is a diagram illustrating an exemplary process of the polymorphic algorithm-based network slice orchestrator service.

FIG. 3B is a diagram illustrating an exemplary process 325 of the polymorphic algorithm-based network slice orchestrator service. For example, network slice evaluator 315 may invoke a reactive mode of operation of orchestrator device 130 based on RAN performance validation, as previously described.

In block 330, orchestrator device 130 may identify a RAN performance metric below a threshold score. In block 333, orchestrator device 130 may employ a reactive polymorphic algorithm of the identified RAN performance metric for a target network device of relevance to a network slice and associated tier of network. In block 335, orchestrator device 130 may transition a DNAP of the network slice to a different tier of the network. In block 337, it may be determined whether the RAN performance metric is met. For example, subsequent adjustments to the target network device based on the reactive polymorphic algorithm and the DNAP, orchestrator device 130 may determine whether the RAN performance metric satisfies the threshold score. The reactive polymorphic algorithm type may alter parameter or configuration values of a profile relative to those of a proactive algorithm instance.

When it is determined that the threshold score is not satisfied (block 337—NO), it may be determined whether to continue the reactive procedure (block 340). For example, the reactive procedure may be implemented for a particular length of time, a certain number of iterations, and/or according to other criteria (e.g., rate of improvement, rate of decline, etc.). When it is determined to continue the reactive procedure (block 340—YES), process 325 may return to block 333 in which the reactive polymorphic algorithm may continue to optimize, as described herein (block 343). Orchestrator 130 may or may not also further modify the DNAP. When it is determined to not continue the reactive procedure (block 340—NO), orchestrator device 130 may notify network personnel (block 345). For example, orchestrator device 130 may generate an alert or other type of message, and transmit the alert or message to a suitable device and/or user (e.g., network personnel).

When it is determined that the threshold score is satisfied (block 337—YES), it may be determined whether another RAN performance metric is to be addressed (block 347). As previously described, the polymorphic algorithm may relate to self-configuring, self-optimizing, and/or self-healing genres. Within these genres or categories, the polymorphic algorithms may include context algorithms, mobility algorithms, coverage algorithms, quality algorithms, capacity algorithms, and energy algorithms. The polymorphic algorithm-based network slice orchestrator service may not manage, for example, the same cell sites from multiple tiers using the same type of polymorphic algorithms. The polymorphic algorithms may attain optimization or a performance target by orchestrating the order of the polymorphic algorithms based on their type. For example, orchestrator device 130 may select to initially operate a context algorithm, followed by a mobility algorithm, a coverage algorithm, a quality algorithm, a capacity algorithm, and an energy algorithm. According to other exemplary embodiments, the order of the type of polymorphic algorithms may be different. Additionally, for example, the polymorphic algorithms may include proactive polymorphic algorithms and reactive polymorphic algorithms. For example, proactive polymorphic algorithms may set or establish initial or default values of a profile, and reactive polymorphic algorithms may adjust or modify initial or default values responsive to policies and/or thresholds being breached and the transient nature of the network. According to an exemplary embodiment, when orchestrator device 130 invokes a reactive polymorphic algorithm or a proactive polymorphic algorithm of a particular type (e.g., context, coverage, etc.), orchestrator device 130 may relinquish control of a network device or network devices of relevance to the network slice to the reactive polymorphic algorithm or the proactive polymorphic algorithm. That is, orchestrator device 130 may not make any changes to the network device/tier of relevance to the network slice.

Additionally, according to an exemplary embodiment, the transition of running one type of polymorphic to another type may be dependent on successful optimization or attainment of a performance target related to the polymorphic algorithm type, a configured time period, a failure to optimize or attain the performance target, and/or some other criterion. As an example, if a goal function of a polymorphic algorithm type is regressing (e.g., at far edge RAN 206) for mobility, the polymorphic algorithm-based network slice orchestrator service may not progress to a coverage algorithm, but may back out and go to a next group of cells relating to mobility. Depending on the number and/or order of the RAN performance metric, block 347 may or may not have RAN performance metric. Referring to FIG. 3B, when it is determined that there is another RAN performance metric to address (block 347—YES), process 325 may proceed to block 330. However, when it is determined that there is not another RAN performance metric to address (block 347—NO), process 325 may end (block 353).

FIG. 3B illustrates an exemplary process 325, however, according to other embodiments, process 325 may include additional operations, fewer operations, and/or different operations than those illustrated in FIG. 3B, and described herein. For example, process 325 may omit block 333 or block 335 in one or more iterations.

Figure 3C:
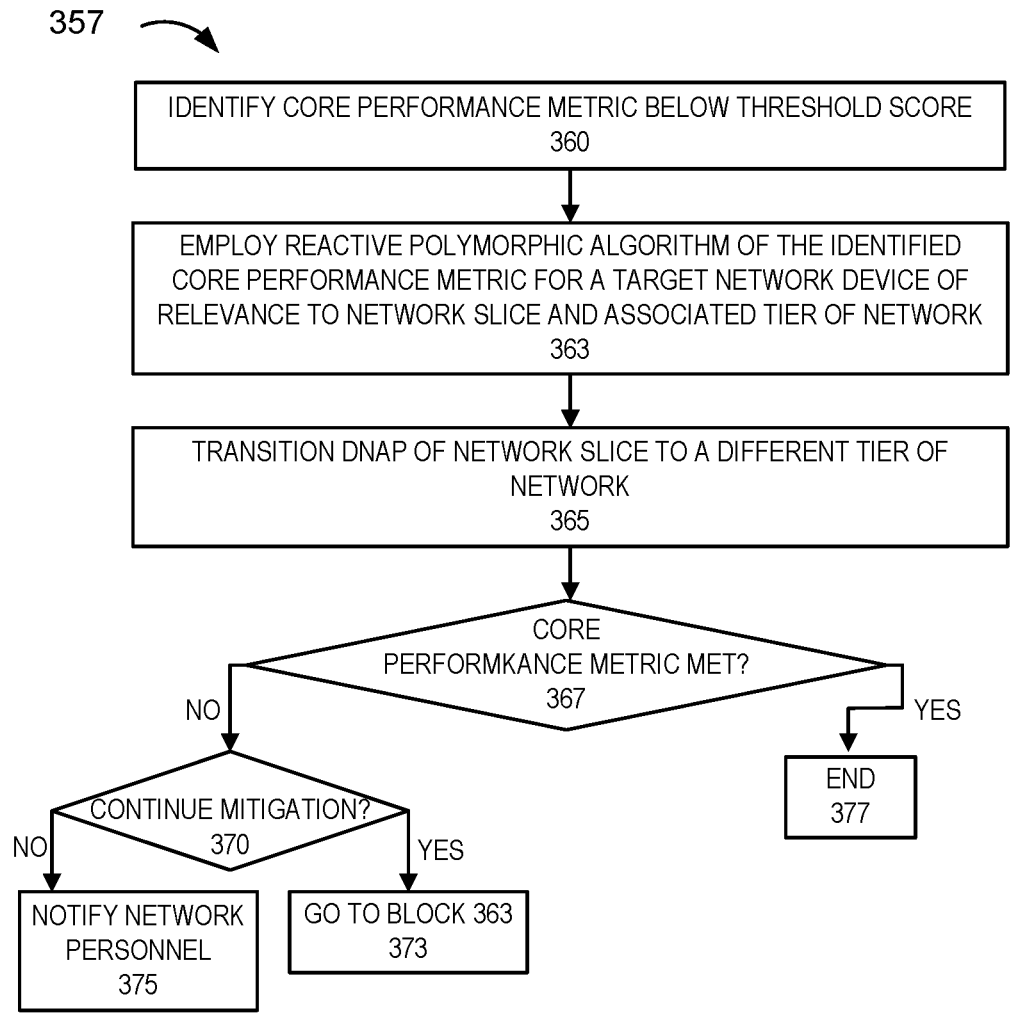
FIG. 3C is a diagram illustrating another exemplary process of the polymorphic algorithm-based network slice orchestrator service.

FIG. 3C is a diagram illustrating an exemplary process 357 of the polymorphic algorithm-based network slice orchestrator service. For example, network slice evaluator 315 may invoke a reactive mode of operation of orchestrator device 130 based on core performance validation, as previously described.

In block 360, orchestrator device 130 may identify a core performance metric below a threshold score. In block 363, orchestrator device 130 may employ a reactive polymorphic algorithm of the identified core performance metric for a target network device of relevance to a network slice and associated tier of network. In block 365, orchestrator device 130 may transition a DNAP of the network slice to a different tier of the network. In block 367, it may be determined whether the core performance metric is met. For example, subsequent adjustments to the target network device based on the reactive polymorphic algorithm and the DNAP, orchestrator device 130 may determine whether the core performance metric satisfies the threshold score. The reactive polymorphic algorithm type may alter parameter or configuration values relative to those of a proactive algorithm instance.

When it is determined that the threshold score is not satisfied (block 367—NO), it may be determined whether to continue the reactive procedure (block 370). For example, the reactive procedure may be implemented for a particular length of time, a certain number of iterations, and/or according to other criteria (e.g., rate of improvement, rate of decline, etc.). When it is determined to continue the reactive procedure (block 370—YES), process 357 may return to block 363 in which the reactive polymorphic algorithm may continue to optimize, as described herein (block 373). Orchestrator 130 may or may not also further modify the DNAP. When it is determined to not continue the reactive procedure (block 370—NO), orchestrator device 130 may notify network personnel (block 375). For example, orchestrator device 130 may generate an alert or other type of message, and transmit the alert or message to a suitable device.

When it is determined that the threshold score is satisfied (block 367—YES), process 357 may end (block 377). Process 357 may be performed in relation to a core performance metric (e.g., topology) in parallel with a different core performance metric (e.g., routing or TCP performance). According to other examples, process 357 may address core performances according to a particular sequence. According to such an implementation, process 357 may include a step similar to that described in block 347 of process 325.

FIG. 3C illustrates an exemplary process 357, however, according to other embodiments, process 357 may include additional operations, fewer operations, and/or different operations than those illustrated in FIG. 3C, and described herein. For example, process 357 may omit block 363 or block 365 in one or more iterations.

FIGS. 4A-4D are diagrams illustrating an exemplary process of an exemplary embodiment of the polymorphic algorithm-based network slice orchestrator service. As illustrated, orchestrator device 130 may receive various inputs, such as core inputs 403, RAN inputs 405, slice/service scope inputs 407, ML model and prediction inputs 410, and network slice generation trigger inputs 413. An input may be of a per slice basis. An input may be of a network device of relevance, of a tier of the network and associated time granularity, and so forth. As an example, core inputs 403 may include information pertaining to congestion state, route congestion, flow state and/or statistics, network topology and/or outages; RAN inputs 405 may include information pertaining to context, optimization state, and performance; slice/service scope inputs 407 may include information pertaining to a bit rate (e.g., guaranteed bit rate (GBR), maximum bit rate (MBR), non-GBR, aggregate MBR (AMBR, etc.), latency, reliability, throughput, and/or other types of QoS, KPIs); ML model and prediction inputs 410 may include information pertaining to a network slice, policies, and/or time granularities, a trained machine learning model of relevance to the network slice and/or application service, anomaly detection; and network slice generation trigger inputs 413 may include information pertaining to network slice constraints for new or existing network slices (e.g., latency, reliability, throughput, and/or other QoS, KPIs; policies, threshold values, and/or other types of configurations), and information pertaining to network slice generational inputs (e.g., end device requests for a network slice, network-based requests for a network slice, etc.). As further illustrated, AI/ML, framework 110 may include slice/service scope inputs 407 (and potential other inputs illustrated in FIG. 4A), which may be used as a basis to provide ML model and prediction inputs 410 to orchestrator device 130. Additionally, as described herein, AI/ML framework 110 may obtain polymorphic algorithm inputs 415, which may relate to proactive and/or reactive polymorphic algorithms. Polymorphic algorithm inputs 415 may include information pertaining to a goal or yield function (e.g., convergence, divergence, etc.).

Figure 4A:
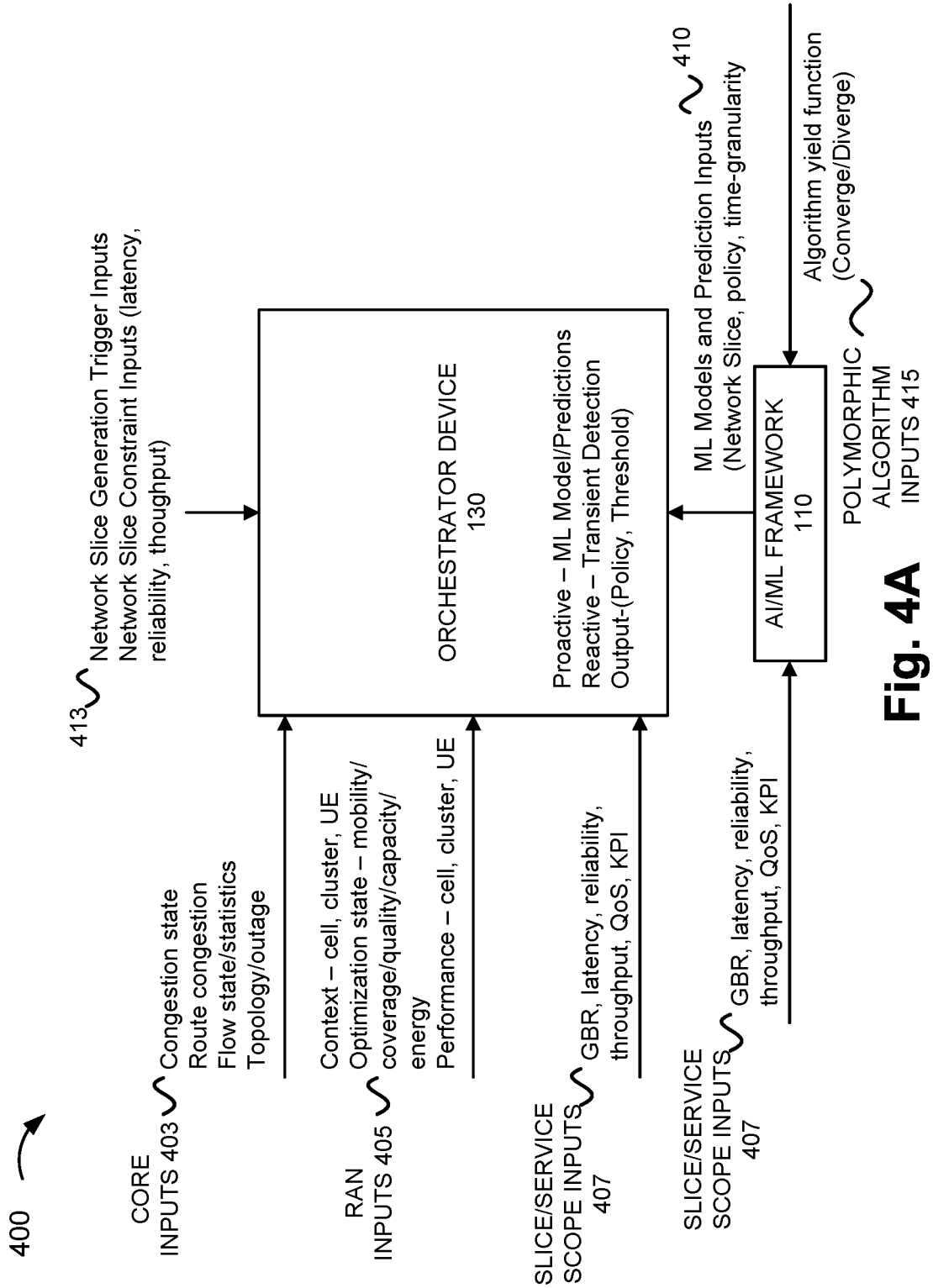
FIGS. 4A-4D are diagrams illustrating still another exemplary process of the polymorphic algorithm-based network slice orchestrator service.
Figure 4B:
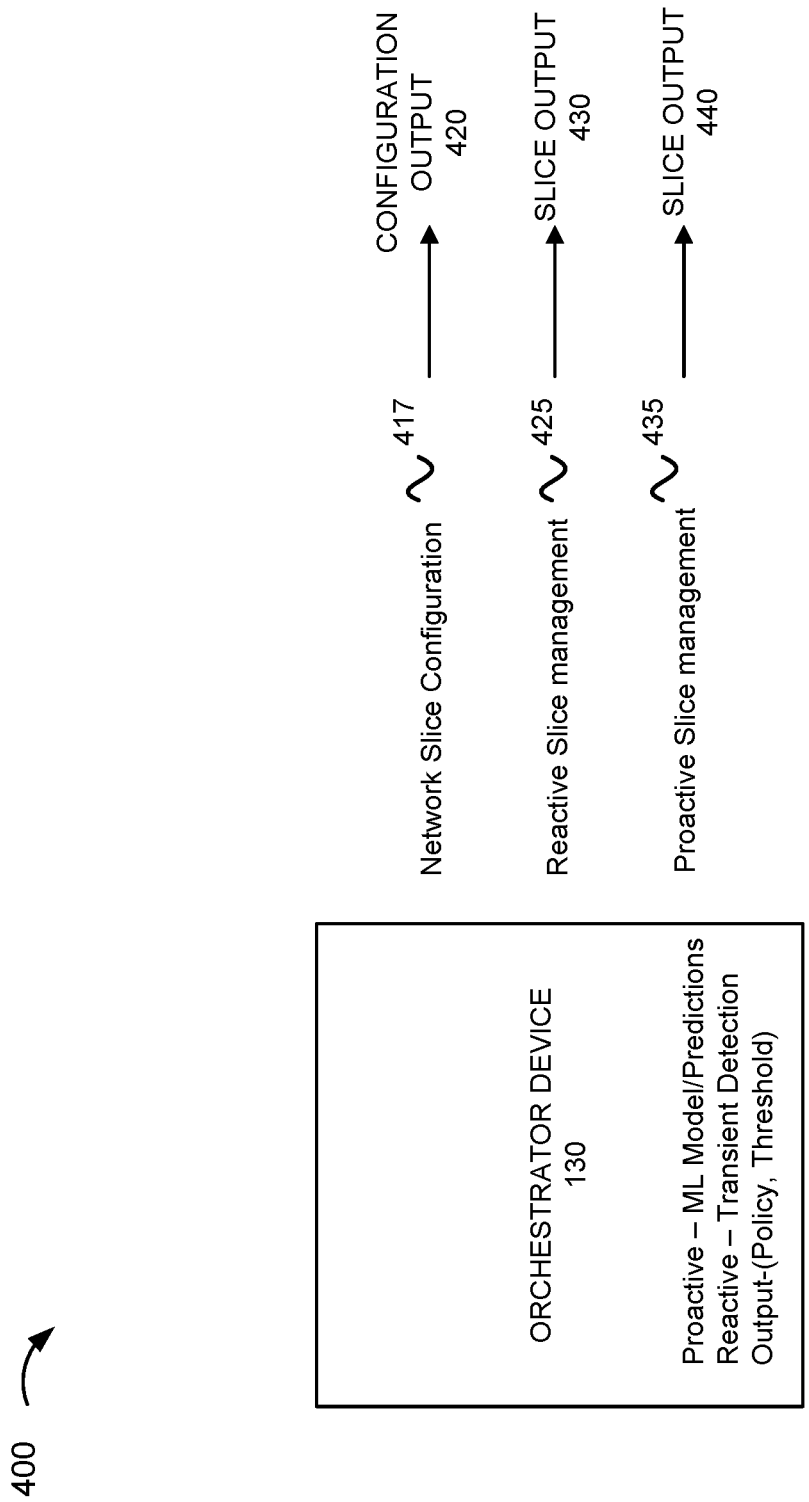

Referring to FIG. 4B, orchestrator device 130 may provide various outputs based on the inputs received. For example, orchestrator device 420 may provide a configuration output 420 relating to network slice configuration 415, a slice profile output 430 relating to reactive slice management 425, and slice output 440 relating to proactive slice management 435. Although not illustrated in FIG. 4B, based on the inputs received, exemplary components of orchestrator device 130, such as those illustrated and described herein, may provide outputs to each other.

Configuration output 420 may include information for (proactively) configuring a network slice. For example, the configuration may include default or initial configurations of the network slice. The configuration may relate to RAN devices, core devices, DNAP devices, and/or application layer devices. Slice output 430 may include information for (reactively) optimizing a network slice. The reactive optimization information may pertain to RAN devices, core devices, DNAP devices, and/or application layer devices, as described herein. For example, the reactive optimization information may provide for radio scheduler adjustments, radio resource configuration, beam steering, other radio and/or core network optimizations (e.g., relating to flow state, congestion, topology, routing, etc.) associated with reactive polymorphic algorithms, tier transition and/or modification of DNAP, and/or reactive configuration adjustments directed to optimization of the network slice and/or network device of relevance, as described herein. Slice output 440 may include information for (proactively) optimizing a network slice. The proactive optimization information may also pertain to RAN devices, core devices, DNAP devices, and/or application layer devices, as described herein. For example, the proactive optimization information may provide for radio scheduler adjustments, radio resource configuration, beam steering, other radio and/or core network optimizations associated with proactive polymorphic algorithms, tier transition and/or modification of DNAP, and/or proactive configuration adjustments of a profile directed to optimization of the network slice and/or network device of relevance, as described herein.

Figure 4C:
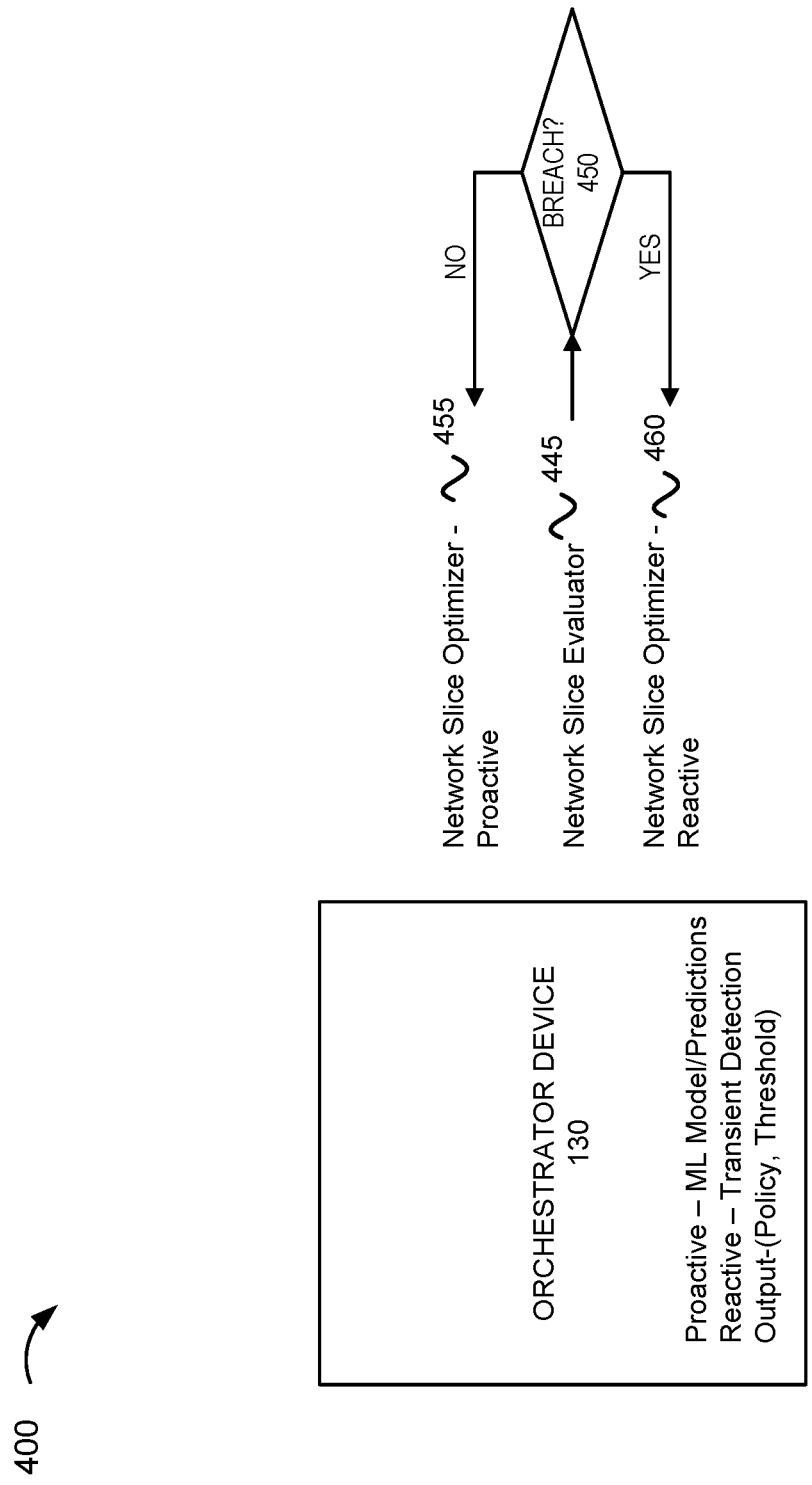
Figure 4D:
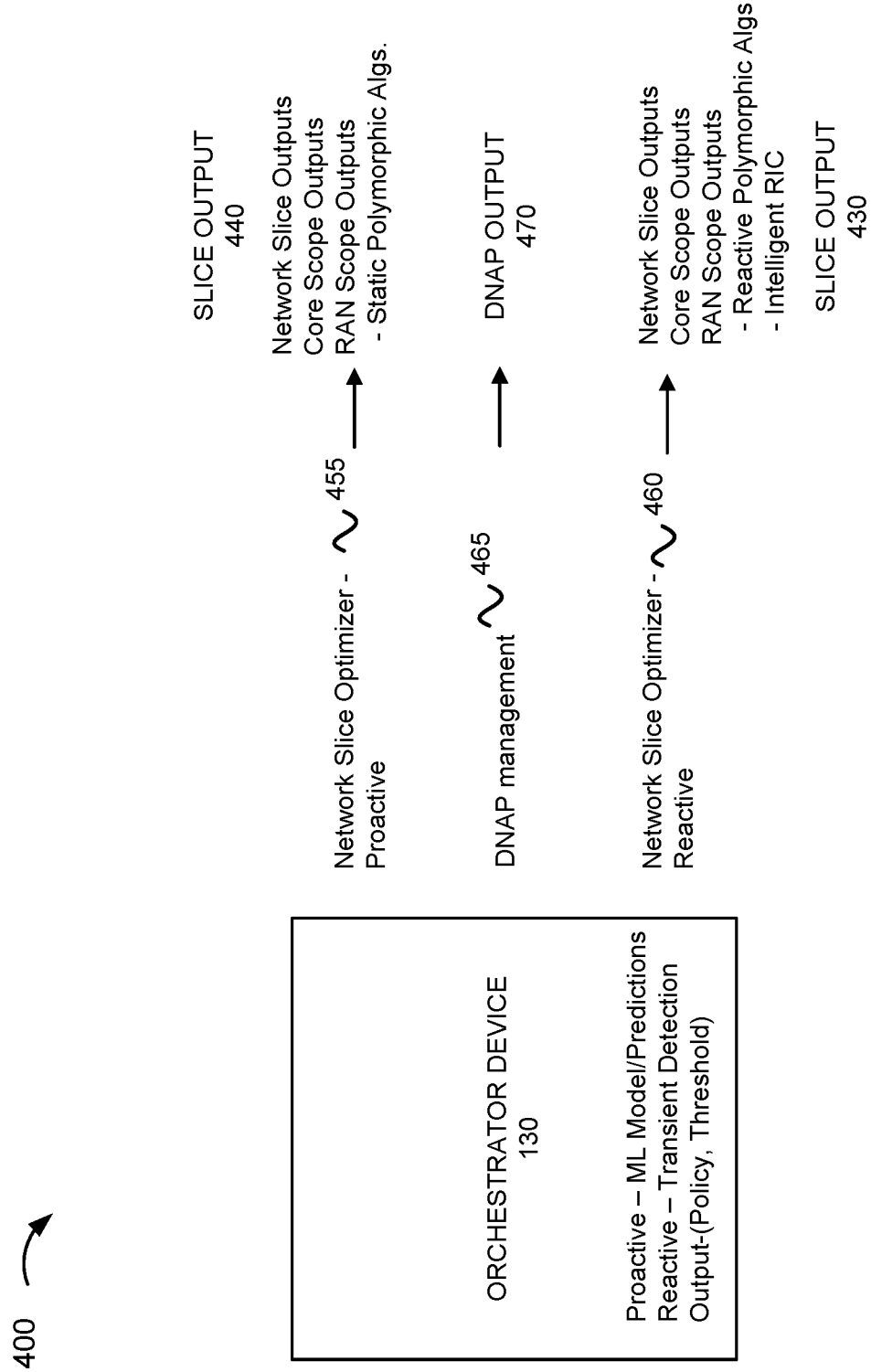

FIG. 4C further illustrates this portion of process 400. For example, in step 445, the network slice evaluator may apply various analytics, which may include determining whether a threshold has been breached relative to a network slice (illustrated as step 450). When the network slice evaluator determines that the threshold has not been breached (step 450—NO), in step 455, the proactive network slice optimizer may generate slice output. When the network slice evaluator determines that the threshold has been breached (step 450—YES), in step 460, the reactive network slice optimizer may generate slice output 460. FIG. 4D illustrates exemplary information included in slice output 430 and slice output 440. Additionally, as illustrated, orchestrator 130 may provide DNAP output 470 pertaining to DNAP management 465. For example, the DNAP output 470 may include information to instantiate a DNAP, manage its lifecycle, and/or manage optimization (e.g., proactively and reactively).

FIG. 5 is a diagram illustrating exemplary components of a device 500 that may be included in one or more of the devices described herein. For example, device 500 may correspond to AI/ML, framework 110, data collector 115, orchestrator device 130, VIM 135, first tier polymorphic algorithms and platform 150, second tier polymorphic algorithms and platform 155, third tier polymorphic algorithms and platform 160, non-real-time RIC 208, near real-time RIC 210, real-time RIC 212, and/or other types of network devices, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to system 100 and/or other network devices, software 520 may include an application that, when executed by processor 510, provides a function of the polymorphic algorithm-based network slice orchestrator service, as described herein. Software 520 may also include firmware, middleware, microcode, hardware description language (HDL), and/or other form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service based interface, or a reference interface, for example.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures and according to various network architectures (e.g., a virtualized function, etc.). Device 500 may be implemented in the same manner. For example, device 500 may be instantiated, created, deleted, or some other operational state during its life-cycle (e.g., refreshed, paused, suspended, rebooted, or another type of state or status), using well-known virtualization technologies (e.g., hypervisor, container engine, virtual container, virtual machine, etc.) in a RAN network and/or another type of network (e.g., a core network, an application layer service network, a MEC network, etc.).

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6:
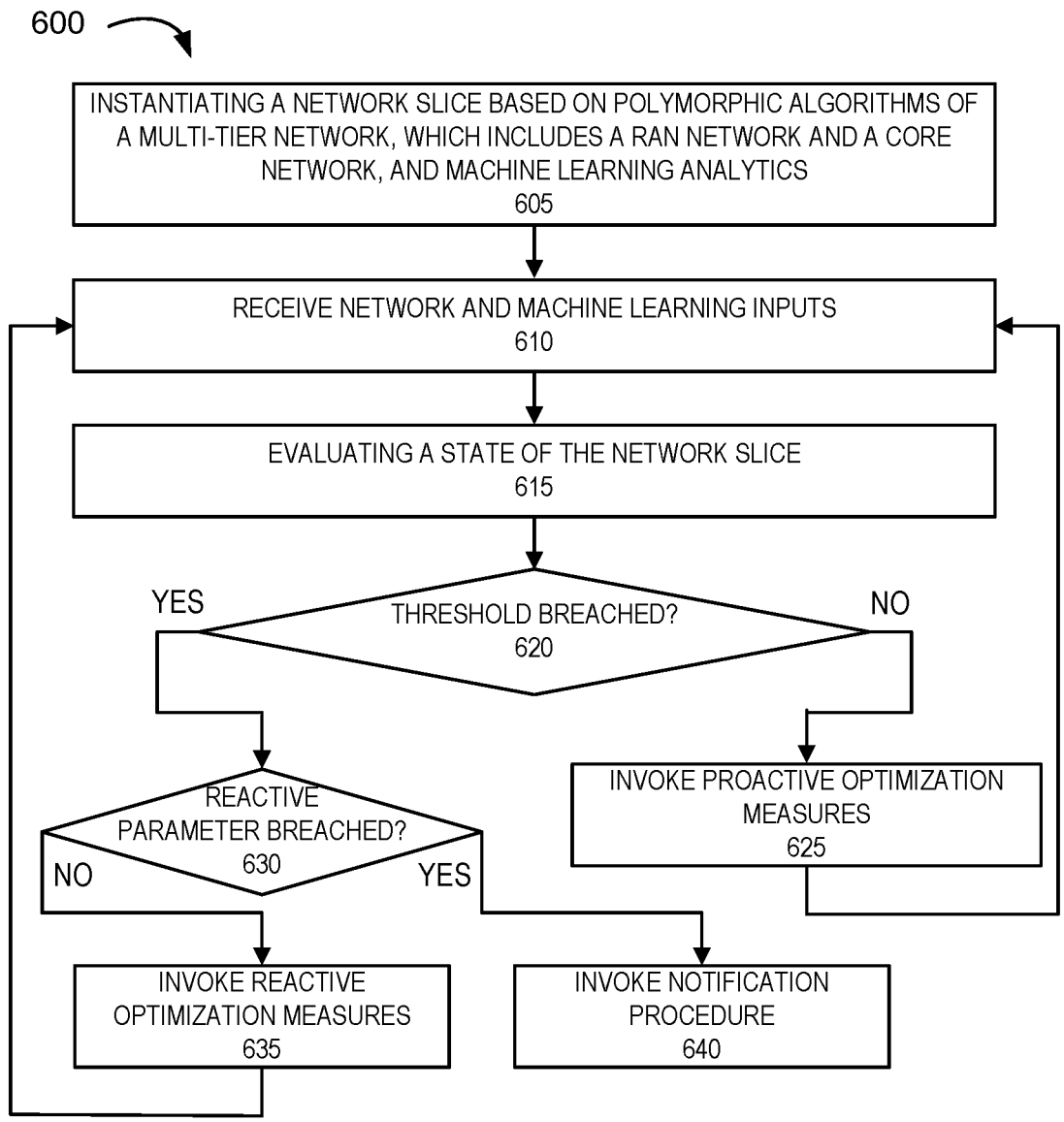
FIG. 6 is a flow diagram illustrating an exemplary process of an exemplary embodiment of the polymorphic algorithm-based network slice orchestrator service.

FIG. 6 is a flow diagram illustrating an exemplary process 600 of an exemplary embodiment of the polymorphic algorithm-based network slice orchestrator service. According to an exemplary embodiment, orchestrator device 130 may perform the steps of process 600. According to an exemplary implementation, processor 510 executes software 520 to perform a step of process 600, as described herein. Alternatively, a step may be performed by execution of only hardware. Process 600 may be performed iteratively.

Referring to FIG. 6, in block 605, orchestrator device 130 may instantiate a network slice based on polymorphic algorithms of a multi-tier network, which includes a RAN network and a core network, and machine learning analytics. For example, orchestrator device 130 may receive a request for a network slice. Orchestrator device 130 may create a network slice (e.g., for an end device) based on a profile, policies, polymorphic algorithms (e.g., context information, etc.), and so forth, as described herein.

In block 610, orchestrator device 130 may receive network and machine learning inputs. For example, orchestrator device 130 may receive information pertaining to a RAN network, a core network, and the network slice, as well as inputs from AI/ML framework 110.

In block 615, orchestrator device 130 may evaluate a state of the network slice. For example, orchestrator device 130 may analyze the received inputs, as described herein. For example, orchestrator device 130 may provide RAN and core performance validations and network slice performance validation.

In block 620, it may be determined whether a threshold of the network slice is breached. For example, orchestrator device 130 may compare a value of the received inputs to a threshold value of the network slice and/or a network device of relevance of the network slice.

When it is determined that the threshold of the network slice is not breached (block 620—NO), orchestrator device 130 may invoke proactive optimization measures (block 625). For example, orchestrator device 130 may manage the execution of polymorphic algorithms (e.g., proactive polymorphic algorithms) and/or the management of DNAP. Orchestrator device 130 may identify a tier of the multi-tier network (e.g., a network device of relevance of the network slice) to which the proactive optimization measures may be directed. Process 600 may continue to block 610.

When it is determined that the threshold of the network slice is breached (block 620—YES), orchestrator device 130 may determine whether a reactive parameter is breached (block 630). For example, orchestrator device 130 may determine whether a policy that manages the reactive mode (e.g., number of iterations, rate of divergence, or other policy as described herein) is satisfied.

When it is determined that the reactive measure is not breached (block 630—NO), orchestrator device 130 may invoke reactive optimization measures (block 635). For example, orchestrator device 130 may manage the execution of polymorphic algorithms (e.g., reactive polymorphic algorithms) and/or the management of DNAP. Orchestrator device 130 may identify a tier of the multi-tier network (e.g., a network device of relevance of the network slice) to which the reactive optimization measures may be directed. Process 600 may continue to block 610.

When it is determined that the reactive measure is breached (block 630—YES), orchestrator device 130 may invoke a notification procedure (block 640). For example, orchestrator device 130 may generate and transmit a message to a network device (e.g., an operations, administration, and maintenance (OAM) device), generate an alarm, or another type of notification to a device and/or network personnel. The message or alert, for example, may indicate a network failure, and may cause subsequent human intervention.

FIG. 6 illustrates an exemplary process 600 of the polymorphic algorithm-based network slice orchestrator service, however, according to other embodiments, process 600 may include additional operations, fewer operations, and/or different operations than those illustrated in FIG. 6, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive. As an example, the polymorphic algorithm-based network slice orchestrator service may be applied to any information system that includes multiple functional elements managed by a multi-tiered system (e.g., having different granularities) in which singular algorithms can manifest at different tiers in an autonomous manner.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in the Figures, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
instantiating, by a device, a network slice based on polymorphic algorithms that operate at different time granularities and different scopes, which include number of nodes, relative to different tiers of a multi-tier network;
receiving, by the device, inputs pertaining to the multi-tier network;
evaluating, by the device, a state of the network slice; and
determining, by the device, whether a threshold of the network slice is satisfied.

2. The method of claim 1, further comprising:
invoking, by the device, a proactive optimization or a reactive optimization of the network slice based on a result of the determining.

3. The method of claim 1, wherein the inputs from the multi-tier network include a first input pertaining to a first network device of a core network and the network slice, a second input pertaining to a second network device of a radio access network and the network slice, and a third input pertaining to a performance metric of the network slice.

4. The method of claim 1, wherein the polymorphic algorithms share a normalized goal function across the different time granularities.

5. The method of claim 1, wherein the inputs include inputs that pertain to a trained machine learning model and anomaly detection.

6. The method of claim 1, wherein the evaluating further comprises:
calculating, by the device, a first optimization state value and a second optimization state value both pertaining to the network slice.

7. The method of claim 6, wherein the first optimization state value pertains to one or more of flow control, routing reliability, or network topology, and wherein the second optimization state value pertains to one or more of mobility, coverage, quality, and capacity.

8. The method of claim 1, wherein an output of the polymorphic algorithms includes a goal function scaling for each network tier.

9. The method of claim 1, wherein the device includes a network slice orchestrator.

10. A device comprising:
a processor, wherein the processor is configured to:
instantiate a network slice based on polymorphic algorithms that operate at different time granularities and different scopes, which include number of nodes, relative to different tiers of a multi-tier network;
receive inputs pertaining to the multi-tier network;
evaluate a state of the network slice; and
determine whether a threshold of the network slice is satisfied.

11. The device of claim 10, wherein the processor is further configured to:
invoke a proactive optimization or a reactive optimization of the network slice based on a result of the determining.

12. The device of claim 10, wherein the inputs from the multi-tier network include a first input pertaining to a first network device of a core network and the network slice, a second input pertaining to a second network device of a radio access network and the network slice, and a third input pertaining to a performance metric of the network slice.

13. The device of claim 10, wherein the polymorphic algorithms share a normalized goal function across the different time granularities.

14. The device of claim 10, wherein the inputs include inputs that pertain to a trained machine learning model and anomaly detection.

15. The device of claim 10, wherein when evaluating, the processor is further configured to:
calculate a first optimization state value and a second optimization state value both pertaining to the network slice.

16. The device of claim 15, wherein the first optimization state value pertains to one or more of flow control, routing reliability, or network topology, and wherein the second optimization state value pertains to one or more of mobility, coverage, quality, or capacity.

17. The device of claim 10, wherein an output of the polymorphic algorithms includes a goal function scaling for each network tier.

18. A non-transitory computer-readable storage medium storing instructions executable by a processor of a device, which when executed cause the device to:
instantiate a network slice based on polymorphic algorithms that operate at different time granularities and different scopes, which include number of nodes, relative to different tiers of a multi-tier network;
receive inputs pertaining to the multi-tier network;
evaluate a state of the network slice; and
determine whether a threshold of the network slice is satisfied.

19. The non-transitory computer-readable storage medium of claim 18, wherein the polymorphic algorithms share a normalized goal function across the different time granularities.

20. The non-transitory computer-readable storage medium of claim 18, wherein the inputs include inputs that pertain to a trained machine learning model and anomaly detection.

* * * * *